(12) United States Patent
Stroila

(10) Patent No.: US 9,596,204 B2
(45) Date of Patent: Mar. 14, 2017

(54) DETERMINATION OF A NAVIGATIONAL TEXT CANDIDATE

(71) Applicant: HERE Global B.V., LB Veldhoven (NL)

(72) Inventor: Matei Nicolae Stroila, Chicago, IL (US)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 14/714,091

(22) Filed: May 15, 2015

(65) Prior Publication Data

US 2016/0337296 A1  Nov. 17, 2016

(51) Int. Cl.
| | |
|---|---|
| *H04L 12/58* | (2006.01) |
| *H04W 4/02* | (2009.01) |
| *H04W 4/04* | (2009.01) |
| *G01C 21/36* | (2006.01) |
| *G01C 21/34* | (2006.01) |
| *G06F 17/24* | (2006.01) |
| *G06F 17/27* | (2006.01) |

(52) U.S. Cl.
CPC .......... *H04L 51/20* (2013.01); *G01C 21/3423* (2013.01); *G01C 21/362* (2013.01); *G01C 21/3673* (2013.01); *G01C 21/3697* (2013.01); *G06F 17/243* (2013.01); *G06F 17/278* (2013.01); *H04W 4/025* (2013.01); *H04W 4/046* (2013.01)

(58) Field of Classification Search
CPC ..... H04L 51/20; G06F 17/243; G06F 17/278; H04W 4/046; H04W 4/025; G01C 21/3697; G01C 21/3423; G01C 21/3673; G01C 21/362

USPC ........................................................ 701/465
See application file for complete search history.

(56) References Cited

U.S. PATENT DOCUMENTS

| | | |
|---|---|---|
| 8,135,377 B2 | 3/2012 | Baghdasaryan et al. |
| 8,315,800 B2 | 11/2012 | Sanchez et al. |

(Continued)

OTHER PUBLICATIONS

Microsoft, "Microsoft Lumia 535—Big on Experience", http://news.microsoft.com/download/presskits/lumia/docs/535RG.pdf, (downloaded from internet Aug. 8, 2015).

(Continued)

*Primary Examiner* — Anne M Antonucci
(74) *Attorney, Agent, or Firm* — Lempia Summerfield Katz LLC

(57) ABSTRACT

A method comprising receiving a text input that defines text input information, determining message text information to include the text input information, determining that at least a portion of the message text information corresponds with a navigational preamble, determining a location candidate based, at least in part, on the navigational preamble, determining at least one navigational text candidate that comprises textual information that is associated with the location candidate, causing display of information indicative of the navigational text candidate, receiving a selection input that is indicative of selection of the navigational text candidate, and causing insertion of the navigational text candidate in the message text information in response to the selection of the navigational text candidate is disclosed.

20 Claims, 10 Drawing Sheets

(56) References Cited

U.S. PATENT DOCUMENTS

| | | | |
|---|---|---|---|
| 8,521,823 B1* | 8/2013 | Sheinberg | G06Q 10/107 370/227 |
| 8,661,330 B1* | 2/2014 | Kilat | G06F 17/243 715/224 |
| 8,677,236 B2 | 3/2014 | Bower et al. | |
| 8,893,023 B2 | 11/2014 | Perry et al. | |
| 9,306,878 B2* | 4/2016 | Patil | G06F 17/276 |
| 2005/0188330 A1 | 8/2005 | Griffin | |
| 2008/0182598 A1 | 7/2008 | Bowman | |
| 2013/0212190 A1* | 8/2013 | Patil | G06F 17/276 709/206 |
| 2013/0324162 A1 | 12/2013 | Fu et al. | |
| 2014/0067371 A1 | 3/2014 | Liensberger | |
| 2014/0297267 A1 | 10/2014 | Spencer et al. | |
| 2014/0372345 A1 | 12/2014 | Bradford et al. | |
| 2015/0281902 A1* | 10/2015 | Lehtiniemi | G06F 3/048 455/456.3 |

OTHER PUBLICATIONS

Facebook Newsroom, "Messenger at F8", http://newsroom.fb.com/news/2015/03/messenger-at-f8/, Mar. 25, 2015.

Wikipedia, "SwiftKey", https://en.wikipedia.org/wiki/SwiftKey, (downloaded from Internet Aug. 8, 2015).

\* cited by examiner

312B

| Restaurant | Cheesie's |
|---|---|
| Cross Streets | W. Belmont Ave and N Sheffield Ave |
| Address | 1501 |
| Street | W Belmont Ave |
| Bus Stop | Route #302 at N Sheffield Ave |

| Restaurant | Briar Street Theater |
|---|---|
| Cross Streets | W. Briar Pl and N Halsted |
| Address | 1804 |
| Street | W Briar Pl |

| Train Station | Belmont Station |
|---|---|
| Cross Streets | W. Belmont Ave and N Sheffield Ave |
| Address | 1514 |
| Street | W Belmont Ave |

FIG. 3D

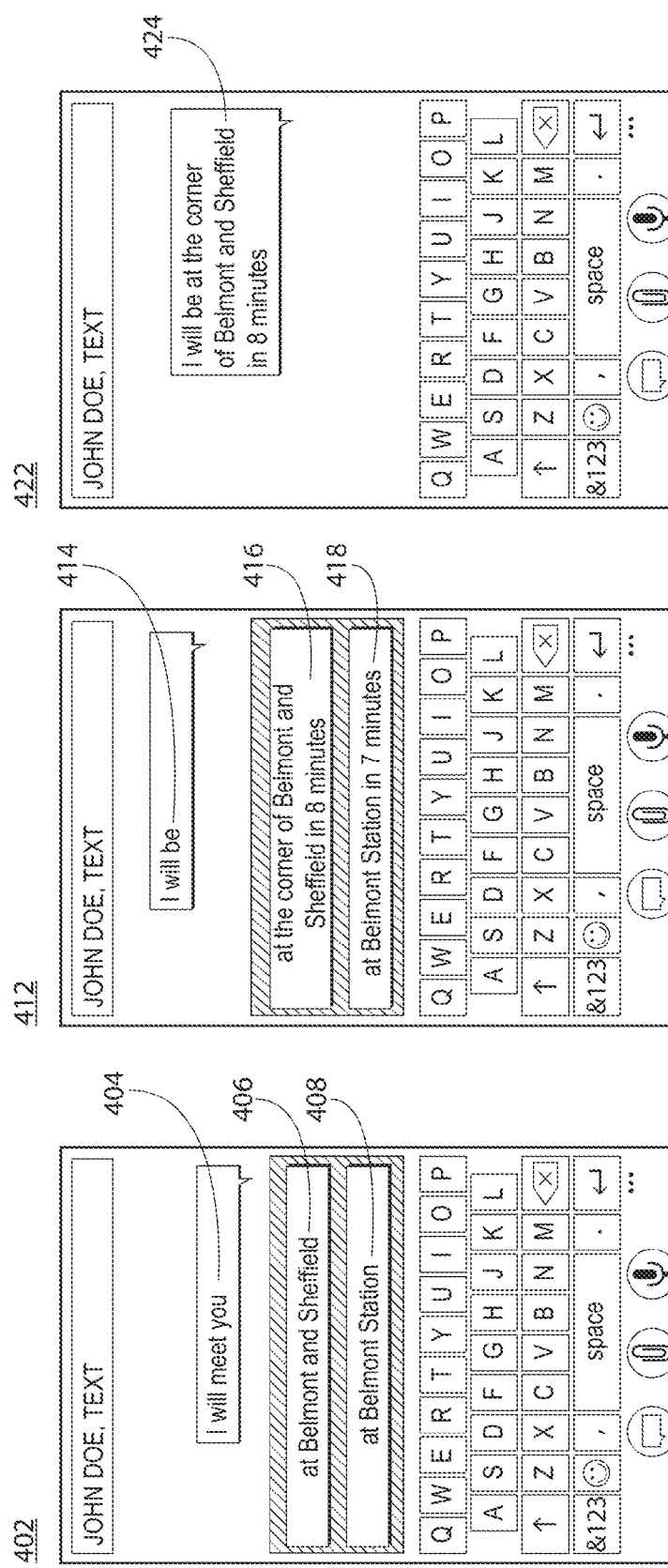

500

| 502 | 504 |
|---|---|
| Train | Train Station |
| Train | Cross Streets |
| Bus | Bus Stop |
| Bus | Cross Streets |
| Bicycle | Address |
| Bicycle | Point of Interest |

| 512 | 514 | 516 |
|---|---|---|
| Train | Train Station | 100 |
| Train | Cross Streets | 80 |
| Bus | Bus Stop | 60 |
| Bus | Cross Streets | 95 |
| Bicycle | Address | 50 |
| Bicycle | Point of Interest | 85 |

| 522 | 524 | 526 |
|---|---|---|
| Train | Train | Train Station |
| Train | Train | Cross Streets |
| Train | Automobile | Train Station |
| Train | Bicycle | Point of Interest |
| Train | Walking | Cross Streets |
| Automobile | Train | Address |

FIG. 5C

DETERMINATION OF A NAVIGATIONAL TEXT CANDIDATE

TECHNICAL FIELD

The present application relates generally to determination of a navigational text candidate.

BACKGROUND

As electronic apparatuses become more pervasive, many users are increasingly using such apparatuses for purposes relating to navigation, communication, and/or the like. As such, it may be desirable to configure an electronic apparatus such that the electronic apparatus facilitates a user in communicating information to a recipient.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving a text input that defines text input information, determining message text information to include the text input information, determining that at least a portion of the message text information corresponds with a navigational preamble, determining a location candidate based, at least in part, on the navigational preamble, determining at least one navigational text candidate that comprises textual information that is associated with the location candidate, causing display of information indicative of the navigational text candidate, receiving a selection input that is indicative of selection of the navigational text candidate, and causing insertion of the navigational text candidate in the message text information in response to the selection of the navigational text candidate.

One or more example embodiments may provide an apparatus, a computer readable medium, a computer program product, and/or a non-transitory computer readable medium having means for receiving a text input that defines text input information, means for determining message text information to include the text input information, means for determining that at least a portion of the message text information corresponds with a navigational preamble, means for determining a location candidate based, at least in part, on the navigational preamble, means for determining at least one navigational text candidate that comprises textual information that is associated with the location candidate, means for causing display of information indicative of the navigational text candidate, means for receiving a selection input that is indicative of selection of the navigational text candidate, and means for causing insertion of the navigational text candidate in the message text information in response to the selection of the navigational text candidate.

In at least one example embodiment, the determination of the location candidate is based, at least in part, on a user location.

One or more example embodiments further perform determination of the user location that is a location associated with a user.

In at least one example embodiment, the determination of the location candidate is based, at least in part, on the user location.

In at least one example embodiment, the user location is a current user location.

In at least one example embodiment, the user location is a destination user location.

In at least one example embodiment, the determination of the user location comprises receipt of information indicative of a predetermined destination user location and determination of the user location to be the predetermined destination user location.

In at least one example embodiment, the determination of the user location comprises receipt of user secondary information and determination of the user location based, at least in part, on the user secondary information.

In at least one example embodiment, the navigational text candidate comprises textual information that is descriptive of the location candidate.

One or more example embodiments further perform determination of a user arrival time for the location candidate.

In at least one example embodiment, the navigational text candidate comprises textual information that is indicative of the user arrival time.

One or more example embodiments further perform determination of a recipient for the message text information, determination of a recipient location that is a location associated with the recipient, and determination of a recipient arrival time for the location candidate.

In at least one example embodiment, the navigational text candidate comprises textual chronological information that is indicative of the recipient arrival time.

In at least one example embodiment, the navigational preamble is a textual phrase that indicates a user desire to convey textual information that is associated with a location candidate.

In at least one example embodiment, the navigational preamble is a current state navigational preamble that indicates a user desire to convey textual information that is associated with a current state of the user.

In at least one example embodiment, the navigational preamble is a future state navigational preamble that indicates a user desire to convey textual information that is associated with a future state of the user.

One or more example embodiments further perform determination of a recipient for the message text information, and determination of a recipient location that is a location associated with the recipient.

In at least one example embodiment, the determination of the location candidate is based, at least in part, on the recipient location.

In at least one example embodiment, the determination of the recipient for the message text information comprises determination of a recipient identifier associated with the recipient, and the determination of the recipient location comprises determination of the recipient location based, at least in part, on the recipient identifier.

In at least one example embodiment, the recipient identifier is at least one of a phone number, a recipient user account, or a separate apparatus identifier.

In at least one example embodiment, the recipient location is a current recipient location.

In at least one example embodiment, the recipient location is a destination recipient location.

In at least one example embodiment, the determination of the recipient location comprises receipt of information indicative of a predetermined destination recipient location and determination of the recipient location to be the predetermined destination recipient location.

In at least one example embodiment, the determination of the recipient location comprises receipt of recipient secondary information and determination of the recipient location based, at least in part, on the recipient secondary information.

In at least one example embodiment, the determination of the navigational text candidate is based, at least in part, on the recipient location.

In at least one example embodiment, the determination of the navigational text candidate comprises determination that the recipient location differs from the location candidate, and the determination of the navigational text candidate comprises determination, in response to the determination that the recipient location differs from the location candidate, of the navigational text candidate to comprise textual location information that is indicative of the location candidate.

In at least one example embodiment, the textual location information comprises textual information that is descriptive of at least one aspect of the location candidate.

In at least one example embodiment, the textual location information comprises textual coordinate information that is indicative of geographical coordinates associated with the location candidate.

In at least one example embodiment, the textual location information comprises textual address information that is indicative of an address associated with the location candidate.

In at least one example embodiment, the textual location information comprises textual cross-street information that is indicative of a set of cross-streets associated with the location candidate.

In at least one example embodiment, the determination of the navigational text candidate comprises determination that the recipient location corresponds with the location candidate, and the determination of the navigational text candidate comprises determination, in response to the determination that the recipient location corresponds with the location candidate, of the navigational text candidate to comprise textual point of interest information that is indicative of a point of interest at the location candidate.

In at least one example embodiment, the textual point of interest information comprises textual information that is indicative of at least one point of interest associated with the location candidate.

In at least one example embodiment, the recipient location is a destination recipient location.

One or more example embodiments further perform determination of a destination user location.

In at least one example embodiment, the determination of the location candidate is based, at least in part, on the destination user location and the destination recipient location.

In at least one example embodiment, the determination of the location candidate comprises determination of the location candidate to be an intersecting location at an intersection between a path from a current user location to the destination user location and a path from a current recipient location to the destination recipient location.

One or more example embodiments further perform determination of a transportation mode.

In at least one example embodiment, the determination of the navigational text candidate is based, at least in part, on the transportation mode.

In at least one example embodiment, the transportation mode is a user transportation mode.

In at least one example embodiment, the transportation mode is a recipient transportation mode.

In at least one example embodiment, the transportation mode is based, at least in part, on a correlation between a user transportation mode and a recipient transportation mode.

In at least one example embodiment, the location candidate is determined absent consideration of the transportation mode.

In at least one example embodiment, the determination of the location candidate is based, at least in part, on the transportation mode.

In at least one example embodiment, the determination of the navigational text candidate comprises determination of a navigational attribute type based, at least in part, on correlation between the navigational attribute type and the transportation mode, identification of a navigational attribute of the navigational attribute type, the navigational attribute corresponding with the location candidate, and determination of the navigational text candidate to comprise textual information indicative of the navigational attribute.

In at least one example embodiment, the determination of the transportation mode comprises determination of a user transportation mode and determination of a recipient transportation mode.

In at least one example embodiment, the determination of the navigational text candidate comprises determination of a navigational attribute type based, at least in part, on correlation between the navigational attribute type, the user transportation mode, and the recipient transportation mode, identification of a navigational attribute of the navigational attribute type, the navigational attribute corresponding with the location candidate, and determination of the navigational text candidate to comprise textual information indicative of the navigational attribute.

BRIEF DESCRIPTION OF THE DRAWINGS

For a more complete understanding of one or more example embodiments, reference is now made to the following descriptions taken in connection with the accompanying drawings in which:

FIGS. 3A-3D are diagrams illustrating map information and navigational attributes according to at least one example embodiment;

FIGS. 4A-4C are diagrams illustrating user interfaces according to at least one example embodiment;

FIGS. 5A-5C are diagrams illustrating association tables according to at least one example embodiment;

DETAILED DESCRIPTION OF THE DRAWINGS

Figure 1:
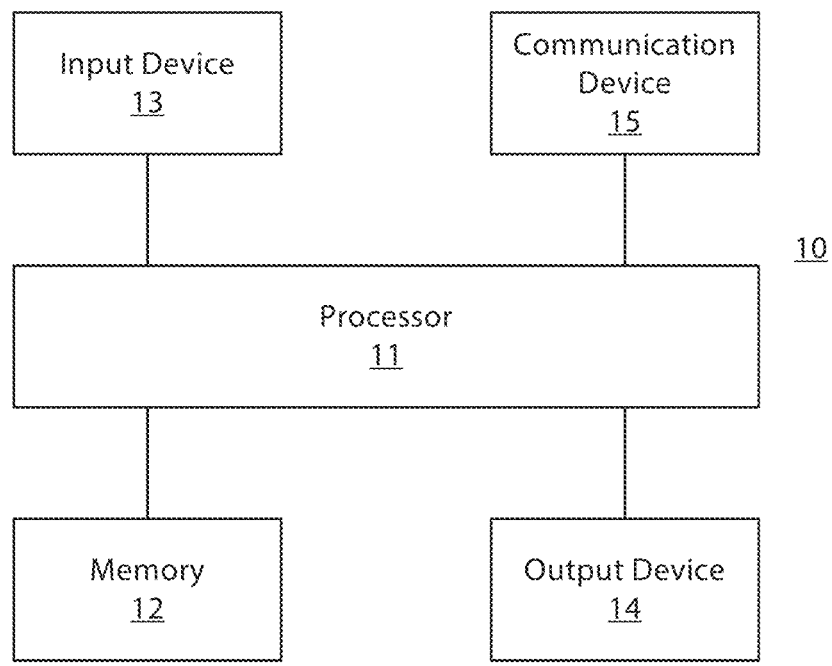
FIG. 1 is a block diagram showing an apparatus according to at least one example embodiment.

Various example embodiments and some of their potential advantages are understood by referring to FIGS. 1 through 10 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

One or more example embodiments may include a geographic database. For example, the geographic database may comprise map information associated with FIG. 3A, navigational attributes associated with FIGS. 3B-3D, and/or the like. For example, the geographic database may include node data records, road segment or link data records, point of interest (POI) data records, and other data records. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by an end user device, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, a server side geographic database may be a master geographic database, but in alternate embodiments, a client side geographic database may represent a compiled navigation database that may be used in or with end user devices to provide navigation and/or map-related functions. For example, the geographic database may be used with an end user device to provide an end user with navigation features. In such an example, the geographic database may be downloaded or stored on the end user device, such as in one or more applications, or the end user device may access the geographic database through a wireless or wired connection (such as via a server and/or a communication network), for example.

In at least one example embodiment, the end user device is one of an in-vehicle navigation system, a personal navigation device (PND), a portable navigation device, a cellular telephone, a mobile phone, a personal digital assistant (PDA), a watch, a camera, a computer, and/or other device that may perform navigation-related functions, such as digital routing and map display. In at least one example embodiment, the navigation device is a cellular telephone. An end user may use the end user device for navigation and map functions such as guidance and map display, for example, and for determination of one or more personalized routes or route segments based on one or more calculated and recorded routes, according to exemplary embodiments.

Figure 2:
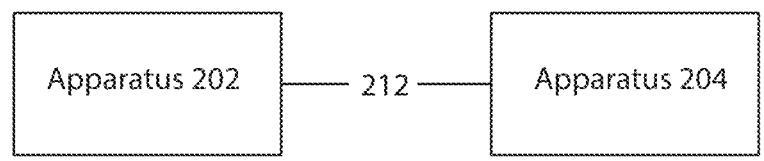
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In the example of FIG. 2, apparatus 202 is an electronic apparatus. An electronic apparatus may be an electronic apparatus that a user commonly utilizes during performance of various tasks, activities, and/or the like. For example, apparatus 202 may be an electronic apparatus that the user frequently utilizes to view map information, to browse map information, to search for points of interests, to provide routing information which may be used to travel to a particular destination, etc. For example, the electronic apparatus may be a phone, a tablet, a computer, a laptop, a near eye apparatus, and/or the like. In the example of FIG. 2, apparatus 204 is a separate apparatus, such as a separate electronic apparatus. For example, separate electronic apparatus may be used collaboratively with the electronic apparatus, in conjunction with the apparatus, in addition to the electronic apparatus, such that the separate apparatus is supporting one or more services associated with the electronic apparatus, and/or the like. In another example, the separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, a near eye apparatus, and/or the like. Although the aforementioned example describes apparatus 202 and apparatus 204 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

FIGS. 3A-3D are diagrams illustrating map information and navigational attributes according to at least one example embodiment. The examples of FIGS. 3A-3D are merely examples and do not limit the scope of the claims. For example, map information may vary, user location and/or recipient location may vary, routes may vary, indicators may vary, data associations may vary, navigational attribute types and/or navigational attributes may vary, and/or the like.

In many circumstances, a user may interact with one or more programs, such as a mapping program, a navigation program, and/or the like throughout the day. Programs, such as an interactive mapping program, a navigation program, and/or the like, may provide particular features to a user of the program. For example, an interactive mapping program may offer navigation features, routing information, mapping information, recommendations, notifications, advertising, and/or the like. Such features may be referred to as map functions. For example, the user may utilize an interactive mapping program on a mobile device, such as a cellular telephone, a tablet computer, and/or the like to identify navigation routes, points of interest, and/or the like. Programs such as these may cause display of visual information based, at least in part, on map functions, user inputs, stored data, retrieved data, and/or the like.

Figure 3A:
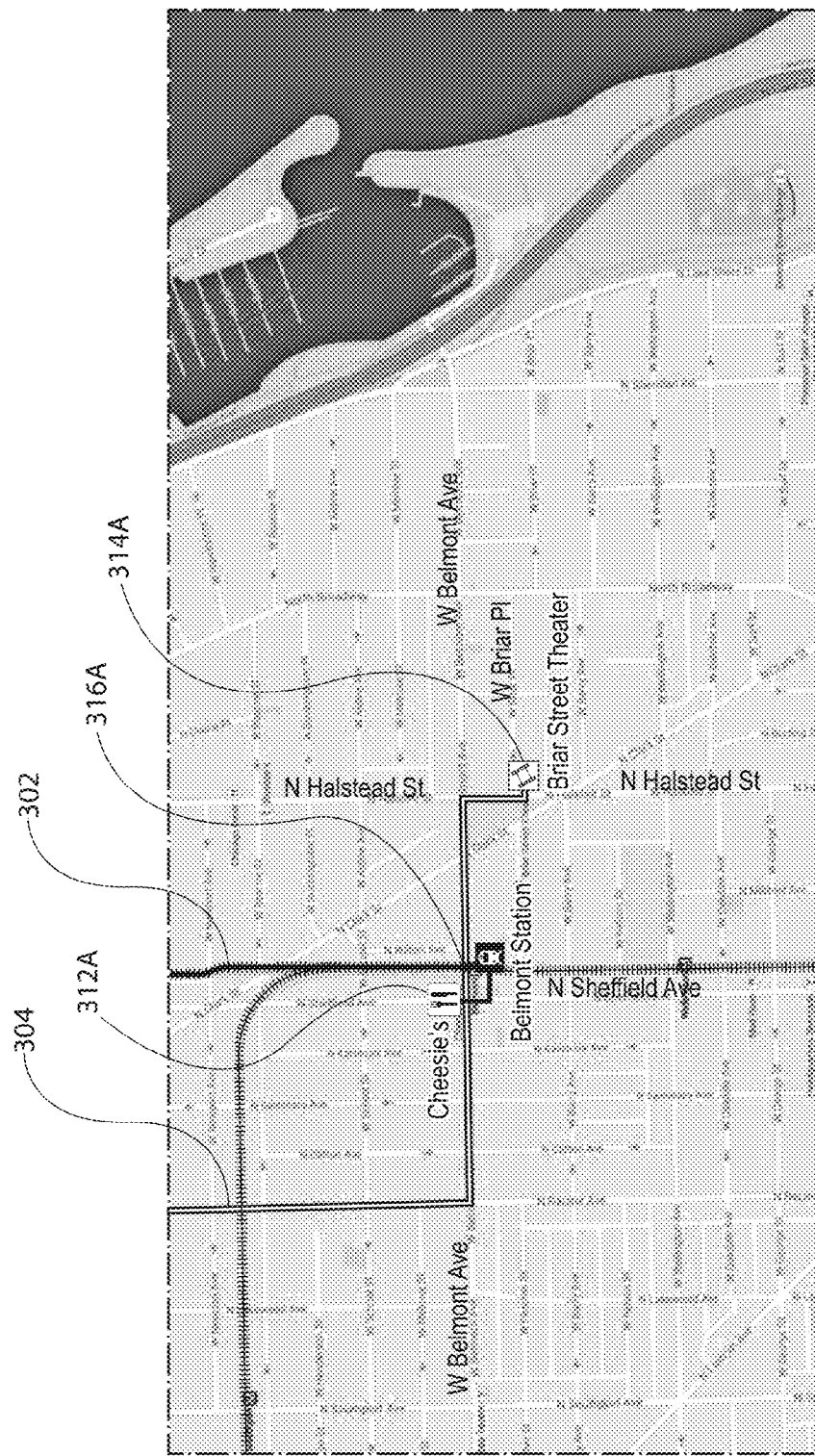

FIG. 3A is a diagram illustrating map information according to at least one example embodiment. The example of FIG. 3A depicts a visual representation of map information. The visual representation of map information may be representative of information received, generated, displayed, and/or the like from a program, such as an interactive mapping program, a navigation program, and/or the like. In the example of FIG. 3A, the visual representation comprises visual representations of various roads, points of interest, as well as visual indicators 302, 304, 312A, 314A, and 316A. In the example of FIG. 3A, visual indicator 302 is representative of a route between a location that is outside of the bound of the visual representation of the map information and the location represented by visual indicator 312A. As can be seen, a portion of the route indicated by visual indicator 302 follows along tracks of a train, subway, light rail, and/or the like, and terminates at Belmont Station, as indicated by visual indicator 316A. In this manner, a user riding on a train, in a subway car, on a light rail, and/or the like may exit the train at Belmont Station and continue towards Cheesie's on foot, via automobile, via bicycle, and/or the like. Visual indicator 312A may, for example, be representative of a destination location (e.g. a destination of a user, a future location of a user, etc.), a point of interest, a specific address, and/or the like. As can be seen in the example of FIG. 3A, visual indicator 312A is associated with Cheesie's, which is at the corner of W Belmont Ave and N Sheffield Ave.

In the example of FIG. 3A, visual indicator 304 is representative of a route between a location that is outside of the bound of the visual representation of the map information and the location represented by visual indicator 314A. For example, visual indicator 314A may be representative of a location of a destination location, a point of interest, a specific address, and/or the like. As can be seen in the example of FIG. 3A, visual indicator 314A is associated with Briar Street Theater, which is at the corner of W Briar Pl and N Halstead St. As can be seen, the route indicated by visual indicator 304 follows along various roads, streets, thoroughfares, and/or the like, and terminates at Briar Street Theater, as indicated by visual indicator 314A. In this manner, a user traversing the path may be on foot, riding a bicycle, driving a vehicle, riding on a bus, and/or the like.

As can be seen in the example of FIG. 3A, the route indicated by visual indicator 302 and the route indicated by visual indicator 304 intersect near visual indicator 316A, which is associated with Belmont Station. In this manner, an individual traversing the route indicated by visual indicator 302 and another individual traversing the route indicated by visual indicator 304 may see each other near Belmont Station, meet up at Belmont Station, and/or the like.

Even though the example of FIG. 3A depicts various visual indicators relative to the visual representation of map information, one or more visual indicators may fail to be displayed, information associated with such visual indicators may be lacking, the map information may be referenced without displaying of any visual representations of the map information, and/or the like.

FIG. 3B is a diagram illustrating navigational attributes according to at least one example embodiment. The example of FIG. 3B depicts navigation attribute type—navigation attribute association table 312B. In the example of FIG. 3B, association table 312B is associated with the location represented by representation 312A in the example of FIG. 3A. In this manner, association table 312B comprises information associated with the location represented by representation 312A. For example, association table 312B comprises various navigational attributes of various navigational attribute types. For example, the location representation by representation 312A in the example of FIG. 3A may be described in several different manners, by way of several different navigational attributes of various navigational attribute types, and/or the like. For example, a single location may be described as a "Restaurant" named "Cheesie's," as at the corner of "W Belmont Ave and N Sheffield Ave," and/or the like.

Even though the association table of FIG. 3B is depicted as having a particular order, data structure, arrangement, etc., it should be understood that the data comprised by the depicted association table may have any order, any structure, any arrangement, and/or the like. For example, even though the data in FIG. 3B is illustrated as an association table, it should be understood that the data may comprise any format, such as a database entry, a linked list, an array, and/or the like.

FIG. 3C is a diagram illustrating navigational attributes according to at least one example embodiment. The example of FIG. 3C depicts navigation attribute type—navigation attribute association table 314B. In the example of FIG. 3C, association table 314B is associated with the location represented by representation 314A in the example of FIG. 3A. In this manner, association table 314B comprises information associated with the location represented by representation 314A. For example, association table 314B comprises various navigational attributes of various navigational attribute types. For example, the location representation by representation 314A in the example of FIG. 3A may be described in several different manners, by way of several different navigational attributes of various navigational attribute types, and/or the like. For example, a single location may be described as a "Restaurant" named "Briar Street Theater," as an address on a street "1804 W Briar Pl," and/or the like.

Even though the association table of FIG. 3C is depicted as having a particular order, data structure, arrangement, etc., it should be understood that the data comprised by the depicted association table may have any order, any structure, any arrangement, and/or the like. For example, even though the data in FIG. 3C is illustrated as an association table, it should be understood that the data may comprise any format, such as a database entry, a linked list, an array, and/or the like.

FIG. 3D is a diagram illustrating navigational attributes according to at least one example embodiment. The example of FIG. 3D depicts navigation attribute type—navigation attribute association table 316B. In the example of FIG. 3D, association table 316B is associated with the location represented by representation 316A in the example of FIG. 3A. In this manner, association table 316B comprises information associated with the location represented by representation 316A. For example, association table 316B comprises various navigational attributes of various navigational attribute types. For example, the location representation by representation 316A in the example of FIG. 3A may be described in several different manners, by way of several different navigational attributes of various navigational attribute types, and/or the like. For example, a single location may be described as a "Train Station" named "Belmont Station," as at the corner of "W Belmont Ave and N Sheffield Ave," and/or the like.

Even though the association table of FIG. 3D is depicted as having a particular order, data structure, arrangement, etc., it should be understood that the data comprised by the depicted association table may have any order, any structure, any arrangement, and/or the like. For example, even though the data in FIG. 3D is illustrated as an association table, it should be understood that the data may comprise any format, such as a database entry, a linked list, an array, and/or the like.

FIGS. 4A-4C are diagrams illustrating user interfaces according to at least one example embodiment. The examples of FIGS. 4A-4C are merely examples and do not limit the scope of the claims. For example, user interface elements may vary, user interface design and/or arrangement may vary, navigational preambles may vary, navigational text candidates may vary, and/or the like.

In many circumstances, a user of an electronic apparatus may desire to communicate with other individuals. For example, the user may wish to send another person a text message, an email, an instant message, a message via a social network, and/or the like. In such an example, the user may desire to communicate with the other person in order to facilitate meeting up with the other person, update the other person on the whereabouts of the user, and/or the like. As such, it may be desirable to configure an apparatus such that the apparatus allows a user to quickly, accurately, and intuitively communicate such information to another person.

In order to facilitate such functionality, it may be desirable for an apparatus to be configured such that a user may input textual information by way of the apparatus. In at least one example embodiment, an apparatus receives a text input that defines text input information. The text input may be by way of a physical keyboard, a touchscreen keyboard, a number pad, a speech-to-text transcription functionality, and/or the like. For example, the apparatus may receive an indication of individual letters pressed by a user, of user selection of words presented by a predictive text functionality, of multiple button presses that indicate selection of a particular letter, of speech information that is indicative of a spoken word and that is transcribed to textual information, and/or the like. In at least one example embodiment, an apparatus determines message text information to include the text input information. Message information may, for example, be any textual information that is intended for communication to a recipient, for sending to a messaging platform, such as an instant messaging service, a social network, and/or the like. In this manner, an apparatus may dynamically receive a plurality of text inputs that define various text input information, such as letters, words, and/or the like, and determine message text information to include the various text input information.

As discussed previously, in many circumstances, a user may desire to quickly, efficiently, and intuitively communicate with another individual, such as a friend, a colleague, and/or the like, regarding a location of the user, a location of the other individual, a future location of the user, a future location of the other individual, and/or the like. For example, the user may desire to meet the other individual at a particular place, at a specific time, and/or the like, and may desire to communicate with the other individual in order to coordinate the logistics of such socialization. In this manner, it may be desirable to configure an apparatus such that the apparatus may provide suggested textual information, predictive text recommendations, and/or the like that the user may desire to communicate with another individual.

In order to facilitate such functionality, it may be desirable to configure an apparatus such that the apparatus may determine when a user desires to communicate such information. For example, if the user begins typing out a message to update another individual of the status of the user, the user may commonly begin the message with certain words, particular phrases, and/or the like. For example, the message may begin with "I will be at," "I will see you at," "I am," and/or the like. Such introductory phrases may be referred to as navigational preambles. In at least one example embodiment, a navigational preamble is a textual phrase that indicates a user desire to convey textual information that is associated with a location candidate. A location candidate may be a particular location that the user desires to refer to in a given communication, in a particular message, and/or the like. For example, a location candidate may be a location that the user desires to discuss with a recipient of a message. For example, the navigational preamble may be a current state navigational preamble that indicates a user desire to convey textual information that is associated with a current state of the user. In another example, the navigational preamble may be a future state navigational preamble that indicates a user desire to convey textual information that is associated with a future state of the user. In at least one example embodiment, an apparatus determines that at least a portion of the message text information corresponds with a navigational preamble. In this manner, the apparatus may infer that the user desires to communicate with another individual regarding a particular place, a specific location, a current status of the user, a future user location of the user, and/or the like.

In such circumstances, as discussed previously, it may be desirable to provide a user of an electronic apparatus with predictive text recommendations that are based, at least in part, on the particular navigational preamble, the grammatical structure of the navigational preamble, the tense of the navigational preamble, and/or the like. For example, a navigational preamble of "I am at" may imply that the user desires to communicate information regarding a current status of the user, such as a current location of the user. In another example, a navigational preamble of "I will be" may imply that the user desires to communicate information regarding a future status of the user, such as a future location of the user. As such, the apparatus may be operable to determine textual information that the user would likely desire to communicate to another individual regarding a location candidate. In at least one example embodiment, an apparatus determines a location candidate based, at least in part, on the navigational preamble.

As discussed previously, a user may desire to communicate with another individual regarding a location candidate. In some circumstances, the location candidate may be a particular location associated with the user, such as the user's current location, a future location of the user, a destination of the user, and/or the like. In at least one example embodiment, an apparatus determines a location candidate based, at least in part, on a user location. For example, the apparatus may determine a user location that is a location associated with a user based, at least in part, on a radio positioning system, a cellular positioning system, a satellite-based positioning system, such as Global Positioning System, GLONASS, or Galileo, an assisted satellite-based positioning system, and/or the like. In such an example, the determination of the location candidate may be based, at least in part, on the user location. The user location may be a current user location, a destination user location, a location along a route from the current user location to the destination user location, and/or the like.

In some circumstances, the user location may be a predetermined location. For example, the user may input information that indicates that the user intends to commute to a particular destination. In at least one example embodiment, determination of a user location comprises receipt of information indicative of a predetermined destination user location. In such an example embodiment, the apparatus may determine the user location to be the predetermined destination user location. In another example, the user location may be inferred from user secondary information, such as a calendar event that indicates that the user may be at a particular location at a particular time, a social network post that indicates that the user is planning to be at a specific venue at a specific time, a series of interactions regarding map information that indicates that the user viewed a particular location and/or a route between two locations, and/or the like. In this manner, user secondary information may be any information that facilitates determination of a user location, a location candidate, and/or the like. In at least one example embodiment, the determination of the user location comprises receipt of user secondary information. In such an example embodiment, the apparatus may determine the user location based, at least in part, on the user secondary information.

As discussed previously, in many circumstances, a user may desire to communicate with another individual, to send a message to another individual, and/or the like. In this manner, the user may desire for the message text information, discussed previously, to be sent to the other individual such that the other individual is a recipient of the message text information, may read the message text information, and/or the like. In at least one example embodiment, the apparatus determines a recipient for the message text information. For example, the apparatus may determine a recipient identifier associated with the recipient, such as a phone number, a recipient user account, a separate apparatus identifier, any unique identifier which may be used to uniquely identify the recipient and/or an electronic apparatus being utilized by the recipient, and/or the like.

In some circumstances, a user of an apparatus may desire to communicate with the recipient regarding a current location of the recipient, a future location of the recipient, a destination of the recipient, and/or the like. For example, as discussed previously, the user may desire to meet up with the recipient, to coordinate meeting the recipient at a particular location or at a particular time, and/or the like. In order to support such functionality, it may be desirable to reference a location of a recipient, such as a current location, a future location, a destination location, and/or the like. In at least one example embodiment, an apparatus determines a location candidate based, at least in part, on a recipient location. For example, the apparatus may determine a recipient location that is a location associated with a recipient. For example, the apparatus may receive information that indicates the recipient location, such as geographical coordinates indicative of the recipient location, an address associated with the recipient location, a point of interest associated with the recipient location, and/or the like. In such an example, the determination of the location candidate may be based, at least in part, on the recipient location. The recipient location may be a current recipient location, a destination recipient location, a location along a route from the current recipient location to the destination recipient location, and/or the like. The recipient location may be a location of the recipient, a location of an electronic apparatus utilized by the recipient, and/or the like. In this manner, the apparatus may determine the recipient location based, at least in part, on a recipient identifier.

In some circumstances, the recipient location may be a predetermined location. For example, the recipient may input information that indicates that the recipient intends to commute to a particular destination. In at least one example embodiment, determination of a recipient location comprises receipt of information indicative of a predetermined destination recipient location. In such an example embodiment, the apparatus may determine the recipient location to be the predetermined destination recipient location. In another example, the recipient location may be inferred from recipient secondary information, such as a calendar event that indicates that the recipient may be at a particular location at a particular time, a social network post that indicates that the recipient is planning to be at a specific venue at a specific time, a series of interactions regarding map information that indicates that the recipient viewed a particular location and/or a route between two locations, and/or the like. In this manner, recipient secondary information may be any information that facilitates determination of a recipient location, a location candidate, and/or the like. In at least one example embodiment, the determination of the recipient location comprises receipt of recipient secondary information. In such an example embodiment, the apparatus may determine the recipient location based, at least in part, on the recipient secondary information.

In some circumstances, a user and a recipient may be following different routes to travel to the same destination, to travel to different destinations, and/or the like. In such circumstances, the user's route and the recipient's route may intersect such that the user and the recipient may cross paths, such that at least a portion of the user's route follows at least a portion of the recipient's route, and/or the like. In at least one example embodiment, an apparatus determines a destination user location. In such an example embodiment, the apparatus may receive information indicative of a recipient location that is a destination recipient location. In such an example embodiment, the apparatus may determine a location candidate based, at least in part, on the destination user location and the destination recipient location. For example, the determination of the location candidate may comprise determination of the location candidate to be an intersecting location at an intersection between a path from a current user location to the destination user location and a path from a current recipient location to the destination recipient location. For example, the apparatus may determine a route from a current user location to a destination user location, may receive information indicative of a route being travelled by the recipient, may receive information indicative of a current recipient location and a destination recipient location and determine at least one path, route, etc. between the current recipient location and the destination recipient location, and/or the like. In such an example, the apparatus may determine one or more intersecting locations between the at least two paths and determine that the location candidate is the intersecting location.

In some circumstances, as described previously, a user may desire to communicate information that may be utilized to coordinate meeting another individual, to update the other individual as to an estimated arrival time of the user to a particular location, and/or the like. As such, it may be desirable to configure an apparatus such that the apparatus may facilitate communication of such chronological information with another individual. In at least one example embodiment, an apparatus determines a user arrival time for the location candidate. There are many manners in which to determine an estimated time of arrival, and many more may be developed in the future. As such, the manner in which the apparatus determines the user arrival time does not necessarily limit the scope of the claims. For example, the apparatus may determine a current user location, and determine a path from the current user location to a destination user location, to the location candidate, and/or the like. The apparatus may subsequently determine a user arrival time based, at least in part, on the path from the current user location to the location candidate, an average speed of the user, a mode of transportation of the user, current traffic congestion along the path, and/or the like. The user arrival time may be an offset from a current time (e.g. in 8 minutes), an explicit time of arrival (e.g. at 16:42), and/or the like.

In some circumstances, it may be desirable to utilize a recipient's time of arrival at the location candidate. For example, if the user will arrive at the location candidate in 8 minutes, and the recipient will arrive in 11 minutes, it may be desirable to communicate that the user will see the recipient in 11 minutes, that the user will waiting for the recipient, that the recipient should look for the user when the recipient arrives, and/or the like. In this manner, a user arrival time, a recipient arrival time, and/or the like may be utilized in communication with a recipient. In at least one example embodiment, an apparatus determines a recipient arrival time for the location candidate. For example, the apparatus may determine a current recipient location, receive information indicative of a destination recipient location, and/or the like, and determine a path from the current recipient location to a destination recipient location, to the location candidate, and/or the like. In another example, the apparatus may receive information indicative of a path being followed by the recipient. The apparatus may subsequently determine a recipient arrival time based, at least in part, on the path from the current recipient location to the location candidate, an average speed of the recipient, a mode of transportation of the recipient, current traffic congestion along the path, and/or the like. The recipient arrival time may be an offset from a current time (e.g. in 8 minutes), an explicit time of arrival (e.g. at 16:42), and/or the like.

As discussed previously, in many circumstances, a user may desire to communicate with another individual regarding a location candidate. For example, the user may desire to coordinate meeting the other individual at the location candidate. As such, it may be desirable to configure an apparatus such that the apparatus provides textual information that the user may choose to communicate to the other individual in a dynamic and/or predictive manner. In at least one example embodiment, an apparatus determines at least one navigational text candidate that comprises textual information that is associated with the location candidate. For example, the navigational text candidate may comprise textual information that is descriptive of the location candidate, descriptive of at least one characteristic of the location candidate, and/or the like. In some circumstances, the apparatus may determine more than one navigational text candidate. In such circumstances, a particular one of the navigational text candidates may be a default navigational text candidate, the plurality of navigational text candidates may be weighted and/or ranked based, at least in part, on predetermined criteria, prior user selection of a particular navigational text candidate over a different navigational text candidate, and/or the like. For example, two navigational text candidates may describe the same location candidate in two different manners, may describe two different location candidates, and/or the like. In this manner, in some circumstances, a user may perceive and select one of a plurality of navigational text candidates based, at least in part, on the user's desire to communicate with the recipient regarding a particular location candidate, to describe the location candidate in a certain manner, and/or the like.

In at least one example embodiment, the determination of the navigational text candidate is based, at least in part, on a user location, a recipient location, and/or the like. For example, the location candidate may be determined to be the user location, and the navigational text candidate may be based, at least in part, on the user location. In another example, the location candidate may be determined to be the recipient location, and the navigational text candidate may be based, at least in part, on the recipient location. In some circumstances, it may be desirable to determine the navigational text candidate based, at least in part, on a speed of the user, a speed of the recipient, and/or the like. For example, a user that is stationary may desire to communicate with the recipient regarding the current location of the user. In another example, a user that is moving very quickly (e.g. quickly relative to an average speed of movement associated with a transportation mode of the user) may desire to communicate such an urgency to the recipient, to communicate that the user is rapidly approaching a particular location candidate, and/or the like. In yet another example, a user is moving slowly (e.g. slowly relative to an average speed of movement associated with a transportation mode of the user) may desire to communicate that the user is stuck in traffic, that the user is on her way but may be later than expected, and/or the like. In each of the preceding examples, the navigational text candidate may be based, at least in part, on an average speed of the user, a speed of the user, and/or the like.

As described previously, in many circumstances, the user may desire to communicate with a recipient regarding an estimated time of arrival at the location candidate, a time until the user and the recipient will meet, and/or the like. As such, it may be desirable to determine a navigational text candidate such that the navigational text candidate comprises textual information that is indicative of such chronological aspects. In at least one example embodiment, the navigational text candidate may comprise textual information that is indicative of the user arrival time, textual chronological information that is indicative of the recipient arrival time, and/or the like. For example, the user arrival time may be 8 minutes, and the navigational text candidate may comprise "in 8 minutes." In another example, the user arrival time may be 8 minutes, the current time may be 13:12, and the navigational text candidate may comprise "at 13:20."

In some circumstances, it may be desirable to describe a particular location candidate in different manners. For example, a single location candidate may be described by way of an address of the location candidate, a set of geographical coordinates of the location candidate, a physical description of the location candidate, a point of interest at the location candidate, and/or the like. For example, in some circumstances, it may be more desirable to utilize an address than a set of geographical coordinates to describe a location candidate. In such an example, a user may be familiar with utilization of an address to identify and/or describe the location candidate, and may be unfamiliar with utilization of geographical coordinates to do the same. In circumstances in which a recipient has not yet arrived at a location candidate, it may be desirable to describe the location candidate by way of an address, a set of cross-streets proximate to the location candidate, and/or the like such that the description may facilitate the user in finding the location candidate. However, if the recipient is currently at the location candidate and may readily perceive points of interest at the location candidate, it may be more intuitive to describe the location candidate by way of a particular point of interest associated with the location candidate. For example, if the recipient is currently located at or near the location candidate, it may be more beneficial for a user to communicate "I will meet you at the Washington Statue" or "I will meet you at Belmont Station" than to communicate "I will meet you at 1514 W Belmont Ave" or "I will see you at 41° 50' 13" N and 87° 41' 05" W." As such, it may be desirable to determine a navigational text candidate based, at least in part, on correspondence between a user location and the location candidate, correspondence between a recipient location and the location candidate, correspondence between the user location and the recipient location, and/or the like.

As discussed previously, in circumstances in which the recipient location fails to correspond with the location candidate, it may be desirable to communicate information that describes the location candidate in a manner that facilitates a recipient in locating the location candidate. In at least one example embodiment, the determination of the navigational text candidate comprises determination that the recipient location differs from the location candidate. In such an example embodiment, the apparatus may determine, in response to the determination that the recipient location differs from the location candidate, the navigational text candidate to comprise textual location information that is indicative of the location candidate. The textual location information may, for example, comprise textual information that is descriptive of at least one aspect of a location of the location candidate, such as textual coordinate information that is indicative of geographical coordinates associated with the location candidate, an address associated with the location candidate, a set of cross-streets proximate to the location candidate, an address range associated with the location candidate, and/or the like.

As discussed previously, in circumstances in which the recipient location corresponds with the location candidate, it may be desirable to communicate information that describes the location candidate in a manner that facilitates a recipient in locating the location candidate. In at least one example embodiment, the determination of the navigational text candidate comprises determination that the recipient location corresponds with the location candidate. In such an example embodiment, the apparatus may determine, in response to the determination that the recipient location corresponds with the location candidate, the navigational text candidate to comprise textual point of interest information that is indicative of a point of interest at the location candidate. The textual point of interest information may, for example, comprise textual information that is indicative of at least one point of interest associated with the location candidate, which is descriptive of at least one point of interest at the location candidate, and/or the like. For example, the textual point of interest information may comprise textual information associated with a landmark, a statue, a train station, a bus stop, a restaurant, a hotel, a bench, a flag pole, and/or the like that is associated with the location candidate, at the location candidate, and/or the like.

A location, such as a user location, a recipient location, and/or the like may correspond with another location, such as a location candidate, the user location, the recipient location, and/or the like in a number of manners. For example, two locations may correspond if the locations have identical geographical coordinates (e.g. latitude and longitude), are within a threshold range, and/or the like. A threshold range may refer to a radius around a location in which the location may correspond with a different location. For instance, a recipient location may correspond with a location candidate if geographical coordinates associated with the recipient location indicate that the recipient location is within a radius (e.g. 5 meters, 25, meters, and/or the like) of a location indicated by geographical coordinates associated with the location candidate. For example, a user may specify a particular threshold range (e.g. 5 meters, 25, meters, 100 meters, and/or the like), the threshold may be predetermined, and/or the like. In this manner, a location may correspond with another location if the locations are proximate to each other.

As discussed previously, it may be desirable to describe a particular location candidate in different manners depending upon a user location, a recipient location, a location candidate, and/or the like. In some circumstances, a context of the user and/or a context of the recipient may favor one description over a different description, describing the location candidate by way of textual point of interest information rather than textual location information, and/or the like. For example, a transportation mode of the user, of the recipient, and/or the like may make one description more desirable than another description. In such an example, a user communicating with a recipient who is driving an automobile to the location candidate may desire to describe the location candidate by way of an address such that the recipient may utilize a navigation system to find the location. In another example, a user that is walking to a location candidate may not be familiar with the address of the location candidate or geographical coordinates of the location candidate, and may desire to describe the location candidate by way of a point of interest at the location candidate. As such, it may be desirable to configure an apparatus such that the apparatus may determine a transportation mode of the user, of the recipient, and/or the like.

In at least one example embodiment, an apparatus determines a transportation mode. In such an example embodiment, the determination of the navigational text candidate may be based, at least in part, on the transportation mode. The transportation mode may be a user transportation mode, a recipient transportation mode, and/or the like. The apparatus may determine the transportation mode based, at least in part, on receipt of a user input that designates a particular mode of transportation, receipt of information that indicates a particular user transportation mode, receipt of information that indicates a particular recipient transportation mode, and/or the like. In another example, the apparatus may consider secondary information that is indicative of the transportation mode, and the transportation mode may be determined based, at least in part, on the secondary information. For example, the user may purchase a train ticket prior to boarding a train, may purchase gasoline while driving in a personal automobile, may interact with a bus-related application to facilitate planning of a bus route, and/or the like. In such an example, the apparatus may determine the transportation mode based, at least in part, on the secondary information. In another example, the secondary information may be the availability of certain wireless networks which may be associated with a particular transportation mode. For example, an apparatus may receive information that indicates that a public wireless network associated with a public train system is within range of the user's apparatus. In such an example, the apparatus may determine the transportation mode based, at least in part, on the availability of the wireless network. In yet another example, the apparatus may determine the transportation mode based, at least in part, on a level of ambient noise. For example, walking on the sidewalk of a busy street may be louder than riding in a personal automobile, riding on a train may be associated with certain rhythmic ambient noises, and/or the like.

In some circumstances, the apparatus may determine the transportation mode in the absence of any user input that explicitly identifies the transportation mode. For example, the apparatus may determine the transportation mode based, at least in part, on a context of the apparatus, a context of the user, a context of the recipient, and/or the like. For example, the apparatus may determine the transportation mode based, at least in part, on the user location corresponding with a node of a particular transportation mode, the recipient location corresponding with a node of a particular transportation mode, and/or the like. In another example, the transportation mode may be determined based, at least in part, on a path followed by a user corresponding with a route of a particular transportation mode (e.g. a bus route, a train track, a subway line, a pedestrian walkway, etc.), a path followed by a recipient at least partially corresponding with a route of a particular transportation mode, and/or the like. In yet another example, the transportation mode may be determined based, at least in part, on an average speed of the user, a speed of movement of the user, a movement pattern of the recipient, and/or the like. For instance, an individual riding on a train may generally move at a higher average speed than another individual who is walking or riding on a bicycle, an individual who is riding on a bus may stop more frequently and at more regular intervals than a user who is riding in a personal automobile, and/or the like. In some circumstances, the apparatus may determine the transportation mode based, at least in part, on movement information associated with a user, a recipient, and/or the like. For example, the apparatus may receive movement information from one or more sensors, such as an accelerometer, a gyroscope, and/or the like, and determine the transportation mode based, at least in part, on the movement information. For instance, the movement information may be indicative of a user walking, jogging, cycling, driving, and/or the like. In such an example, the apparatus may correlate the movement information with predetermined movement information that is indicative of a particular transportation mode and determine the transportation mode based, at least in part, on the correlation between the movement information and the predetermined movement information.

For example, the transportation mode may be based, at least in part, on a correlation between a user transportation mode and a recipient transportation mode. For example, if the user and the recipient are both traveling by train, it may be desirable to describe a location candidate by way of a train stop. In another example, if the user and the recipient are both traveling by bus, it may be desirable to describe the location candidate by way of a particular bus stop. In at least one example embodiment, correlation between the user transportation mode and the recipient transportation mode refers to correlation in an association table, similar as described regarding the example of FIG. 5C.

In at least one example embodiment, the determination of the location candidate is based, at least in part, on the transportation mode. For example, the apparatus may determine a transportation mode, and determine a navigational attribute type based, at least in part, on correlation between the navigational attribute type and the transportation mode. Such a correlation may be similar as described regarding the correlation between navigational attribute types and transportation modes in the examples of FIGS. 5A-5B. In another example, the determination of the transportation mode may comprise determination of a user transportation mode and determination of a recipient transportation mode. In such an example, the determination of the navigational text candidate may comprise determination of a navigational attribute type based, at least in part, on correlation between the navigational attribute type, the user transportation mode, and the recipient transportation mode. Such a correlation may be similar as described regarding the correlation between navigational attribute types and transportation modes in the example of FIG. 5C. In at least one example embodiment, the apparatus identifies a navigational attribute of the navigational attribute type, the navigational attribute corresponding with the location candidate, and determines the navigational text candidate to comprise textual information indicative of the navigational attribute. The identification of the navigational attribute of the navigational attribute type may be similar as described regarding the examples of FIGS. 3B-3D.

As described previously, it may be desirable to configure an apparatus such that the apparatus conveniently provides textual information that the user may choose to communicate to the other individual in a dynamic and/or predictive manner. In order to facilitate such user interaction, it may be desirable to display a representations of one or more navigational text candidates such that the user may perceive the navigational text candidate, select a particular navigational text candidate that the user desire to have communicated to a recipient, and/or the like. In at least one example embodiment, an apparatus causes display of information indicative of the navigational text candidate. For example, the apparatus may display information indicative of the navigational text candidate on a display comprised by the apparatus, may send information indicative of the navigational text candidate to a separate apparatus such that the separate apparatus is caused to display information indicative of the navigational text candidate, and/or the like.

In at least one example embodiment, an apparatus receives a selection input that is indicative of selection of a navigational text candidate. The selection input may be any input that designates the navigational text candidate for insertion in the message text information. For example, the selection input may be a touch input, a hover input, a voice command input, and/or the like. For example, the selection input may be a touch input that selects at least a portion of a navigational text candidate (e.g. word by word, phrase by phrase, an entirety of the navigational text candidate, etc.) for insertion in the message text information. In such an example, the apparatus may display a representation of a navigational text candidate at a display position on a display, and the selection input may be a touch input at an input position that corresponds with the display position. In another example, the selection input may be any input that accepts the insertion of the navigational text candidate in the message text information. For example, as a user inputs text information, the navigational text candidate may be automatically inserted into the message text candidate absent receipt of an input that cancels such an insertion. In such an example, the user's continued input of text information may be the selection input. In yet another example, a navigational text candidate may be inserted into the message text information upon receipt of an input indicating that the user desires to communicate the message text information to the recipient (e.g. hitting send). In at least one example embodiment, the apparatus causes insertion of the navigational text candidate in the message text information in response to the selection of the navigational text candidate.

FIG. 4A is a diagram illustrating a user interface according to at least one example embodiment. The example of FIG. 4A depicts user interface 402. As can be seen, user interface 402 is associated with a text messaging application, although any user interface associated with any type of communication application may be utilized. In the example of FIG. 4A, a user may input text information by way of the depicted keyboard such that the user enters the message text information seen in text bubble 404, "I will meet you." In the example of FIG. 4A, the apparatus determines that the message text candidate comprises a navigational preamble, from which the apparatus may infer that the user desires to communicate regarding a particular location candidate, such as a destination location candidate. The apparatus may, for example, determine a location candidate that the user likely desires to describe based, at least in part, on a user location, a recipient location, a user transportation mode, a recipient transportation mode, and/or the like. As can be seen, FIG. 4A depicts navigational text candidate representation 406, which represents a navigational text candidate that comprises the textual information "at Belmont and Sheffield," and navigational text candidate representation 408, which represents a navigational text candidate that comprises the textual information "at Belmont Station." In this manner, the apparatus has determined two different navigational text candidates from which the user may select.

For example, FIG. 4A may correspond with the information depicted in the example of FIG. 3A. As can be seen, the paths represented by representations 302 and 304 intersect near "Belmont Station," which may be described by way of the cross streets of "W Belmont Ave" and "N Sheffield Ave." As can be seen, representation 302 represents a path that follows a train track. As such, the apparatus may determine that the user may desire to communicate the location candidate, which may be the intersecting location between the two paths, as "at Belmont Station" based, at least in part, on the user transportation mode. However, it can also be seen that representation 304 represents a path that fails to follow a train track and, instead, traverses various streets and thoroughfares. In this manner, the apparatus may determine that the user may desire to communicate the location candidate as "at Belmont and Sheffield" based, at least in part, on the recipient transportation mode.

FIG. 4B is a diagram illustrating a user interface according to at least one example embodiment. The example of FIG. 4B depicts user interface 412. As can be seen, user interface 412 is associated with a text messaging application, although any user interface associated with any type of communication application may be utilized. In the example of FIG. 4B, a user may input text information by way of the depicted keyboard such that the user enters the message text information seen in text bubble 414, "I will be." In the example of FIG. 4B, the apparatus determines that the message text candidate comprises a navigational preamble, from which the apparatus may infer that the user desires to communicate regarding a particular location candidate. The apparatus may, for example, determine a location candidate that the user likely desires to describe based, at least in part, on a user location, a recipient location, a user transportation mode, a recipient transportation mode, and/or the like.

As described previously, in some circumstances, it may be desirable to communicate chronological textual information that is indicative of a user arrival time, a recipient arrival time, a difference between the user arrival time and the recipient arrival time (e.g. 3 minutes after you), and/or the like. As can be seen, FIG. 4B depicts navigational text candidate representation 416, which represents a navigational text candidate that comprises the textual information "at the corner of Belmont and Sheffield in 8 minutes," and navigational text candidate representation 418, which represents a navigational text candidate that comprises the textual information "at Belmont Station in 7 minutes." In this manner, the apparatus has determined two different navigational text candidates from which the user may select. For example, the user may be commuting to Belmont Station on a train car that will arrive at the station in 7 minutes. In such an example, the apparatus determined a navigational text candidate that describes the location candidate as "Belmont Station" and has determined a user arrival time, "in 7 minutes," based, at least in part, on the transportation mode being a train, a train schedule, a speed of the user on the train, a user location of the user relative to the location candidate, and/or the like. In such an example, the user may be rendezvousing with a recipient that is unaware of the various locations of train stations, may not be riding a train, and/or the like. As such, it may be desirable to communicate regarding the location candidate in a different manner. For example, as can be seen, the apparatus also determined a navigational text candidate that describes the location candidate as "at the corner of Belmont and Sheffield" and has determined a user arrival time, "in 8 minutes," that is based, at least in part, on the additional time required to walk from the train station to the noted cross streets.

For example, FIG. 4B may correspond with the information depicted in the example of FIG. 3A. As can be seen, the paths represented by representations 302 and 304 intersect near "Belmont Station," which may be described by way of the cross streets of "W Belmont Ave" and "N Sheffield Ave." As can be seen, representation 302 represents a path that follows a train track. As such, the apparatus may determine that the user may desire to communicate the location candidate, which may be the intersecting location between the two paths, as "at Belmont Station" based, at least in part, on the user transportation mode. However, it can also be seen that representation 304 represents a path that fails to follow a train track and, instead, traverses various streets and thoroughfares. In this manner, the apparatus may determine that the user may desire to communicate the location candidate as "at the corner of Belmont and Sheffield" based, at least in part, on the recipient transportation mode.

FIG. 4C is a diagram illustrating a user interface according to at least one example embodiment. The example of FIG. 4C corresponds with the example of FIG. 4B subsequent to insertion of the selected navigational text candidate in the message text information. For example, the user may have selected the navigational text candidate represented by navigational text candidate representation 416 of FIG. 4B such that "at the corner of Belmont and Sheffield in 8 minutes" is appended to the textual information "I will be" of message text information 414 of FIG. 4B, resulting in message text information 424 of FIG. 4C, which reads "I will be at the corner of Belmont and Sheffield in 8 minutes." In this manner, the message text information may be automatically communicated to the recipient, a user may indicate a desire to cause sending of the message text information by way of an input associated with user interface element 426, and/or the like.

FIGS. 5A-5C are diagrams illustrating association tables according to at least one example embodiment. The examples of FIGS. 5A-5C are merely examples and do not limit the scope of the claims. For example, data structures may vary, data associations may vary, association table content may vary, and/or the like.

FIG. 5A is a diagram illustrating an association table according to at least one example embodiment. The example of FIG. 5A depicts transportation mode—navigational attribute type association table 500. As can be seen, column 502 of the association table comprises various transportation modes, and column 504 of the association table comprises various navigational attribute types that correlate with the various transportation modes in column 502. As described previously, a location candidate, a navigational text candidate, and/or the like may be determined based, at least in part, on a transportation mode. Also, as discussed previously, certain descriptions of the location candidate may be more desirable or less desirable based, at least in part, on the transportation mode. As such, transportation mode—navigational attribute type association table 500 comprises a plurality of predetermined, learned, etc. correlations that link various transportation modes to various navigational attribute types. For example, if a user is riding on a train, it may be desirable to characterize a particular location candidate as a particular train station. In another example, if a user is riding a bus, it may be desirable to describe a particular location candidate as being at a set of cross-streets.

Even though the association table of FIG. 5A is depicted as having a particular order, data structure, arrangement, etc., it should be understood that the data comprised by the depicted association table may have any order, any structure, any arrangement, and/or the like. For example, even though the data in FIG. 5A is illustrated as an association table, it should be understood that the data may comprise any format, such as a database entry, a linked list, an array, and/or the like.

FIG. 5B is a diagram illustrating an association table according to at least one example embodiment. The example of FIG. 5B depicts weighted transportation mode—navigational attribute type association table 510. As can be seen, column 512 of the association table comprises various transportation modes, and column 514 of the association table comprises various navigational attribute types that correlate with the various transportation modes in column 512. It can be seen that column 512 of FIG. 5B corresponds with column 502 of FIG. 5A, and that column 514 of FIG. 5B corresponds with column 504 of FIG. 5A. As can be seen, weighted transportation mode—navigational attribute type association table 510 comprises column 516, which ranks, weights, etc. the various navigational attribute types of weighted transportation mode—navigational attribute type association table 510. For example, it can be seen that the "Train" transportation mode correlates with both "Train Station" and "Cross Streets," and that "Train Station" has a higher weight than "Cross Streets." In this manner, the correlation between "Train" and "Train Station" may be the default correlation, a higher ranked correlation, and/or the like.

Even though the association table of FIG. 5B is depicted as having a particular order, data structure, arrangement, etc., it should be understood that the data comprised by the depicted association table may have any order, any structure, any arrangement, and/or the like. For example, even though the data in FIG. 5B is illustrated as an association table, it should be understood that the data may comprise any format, such as a database entry, a linked list, an array, and/or the like.

FIG. 5C is a diagram illustrating an association table according to at least one example embodiment. The example of FIG. 5C depicts user transportation mode—recipient transportation mode—navigational attribute type association table 520. As can be seen, column 522 of the association table comprises various user transportation modes, column 524 of the association table comprises various recipient transportation modes, and column 526 of the associated table comprises various navigational attribute types that correlate with the user transportation modes in column 522 and the recipient transportation modes in column 524. As described previously, a location candidate, a navigational text candidate, and/or the like may be determined based, at least in part, on a transportation mode. For example, a navigational text candidate may be determined to comprise a navigational attribute of a particular navigational attribute type based, at least in part, on correspondence between a user transportation mode, a recipient transportation mode, a navigational attribute type, and/or the like. Also, as discussed previously, certain descriptions of the location candidate may be more desirable or less desirable based, at least in part, on the transportation mode. As such, user transportation mode—recipient transportation mode—navigational attribute type association table 520 comprises a plurality of predetermined, learned, etc. correlations that link various transportation modes to various navigational attribute types. For example, if both the user and the recipient are riding on a train, it may be desirable to characterize a particular location candidate as a particular train station. In another example, if a user is riding a train and the recipient is riding a bicycle, it may be desirable to describe a particular location candidate as being a point of interest.

Even though the association table of FIG. 5C is depicted as having a particular order, data structure, arrangement, etc., it should be understood that the data comprised by the depicted association table may have any order, any structure, any arrangement, and/or the like. For example, even though the data in FIG. 5C is illustrated as an association table, it should be understood that the data may comprise any format, such as a database entry, a linked list, an array, and/or the like.

Figure 6:
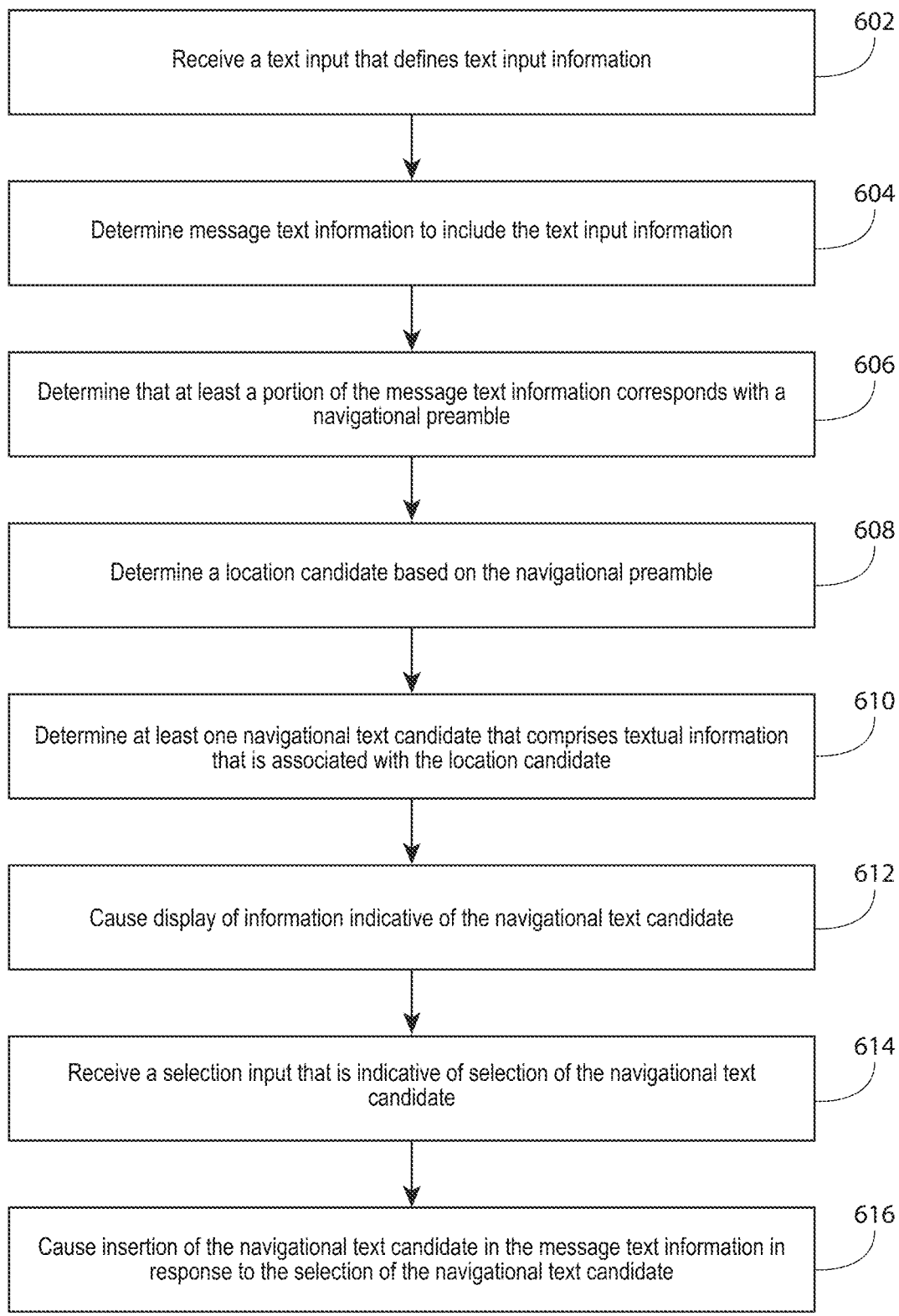
FIG. 6 is a flow diagram illustrating activities associated with determination of at least one navigational text candidate according to at least one example embodiment.

FIG. 6 is a flow diagram illustrating activities associated with determination of at least one navigational text candidate according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As described previously, in many circumstances, it may be desirable to determine at least one navigational text candidate that comprises textual information that is associated with the location candidate.

At block 602, the apparatus receives a text input that defines text input information. The receipt, the text input, and the text input information may be similar as described regarding FIG. 2 and FIGS. 4A-4C.

At block 604, the apparatus determines message text information to include the text input information. The determination and the message text information may be similar as described regarding FIGS. 4A-4C.

At block 606, the apparatus determines that at least a portion of the message text information corresponds with a navigational preamble. The determination and the navigational preamble may be similar as described regarding FIGS. 4A-4C.

At block 608, the apparatus determines a location candidate based, at least in part, on the navigational preamble. The determination and the location candidate may be similar as described regarding FIGS. 3A-3D, FIGS. 4A-4C, and FIGS. 5A-5C.

At block 610, the apparatus determines at least one navigational text candidate that comprises textual information that is associated with the location candidate. The determination and the navigational text candidate may be similar as described regarding FIGS. 3A-3D, FIGS. 4A-4C, and FIGS. 5A-5C.

At block 612, the apparatus causes display of information indicative of the navigational text candidate. The causation of display and the information indicative of the navigational text candidate may be similar as described regarding FIGS. 3A-3D, FIGS. 4A-4C, and FIGS. 5A-5C.

At block 614, the apparatus receives a selection input that is indicative of selection of the navigational text candidate. The receipt and the selection input may be similar as described regarding FIGS. 3A-3D, FIGS. 4A-4C, and FIGS. 5A-5C.

At block 616, the apparatus causes insertion of the navigational text candidate in the message text information in response to the selection of the navigational text candidate. The causation of insertion may be similar as described regarding FIGS. 4A-4C.

Figure 7:
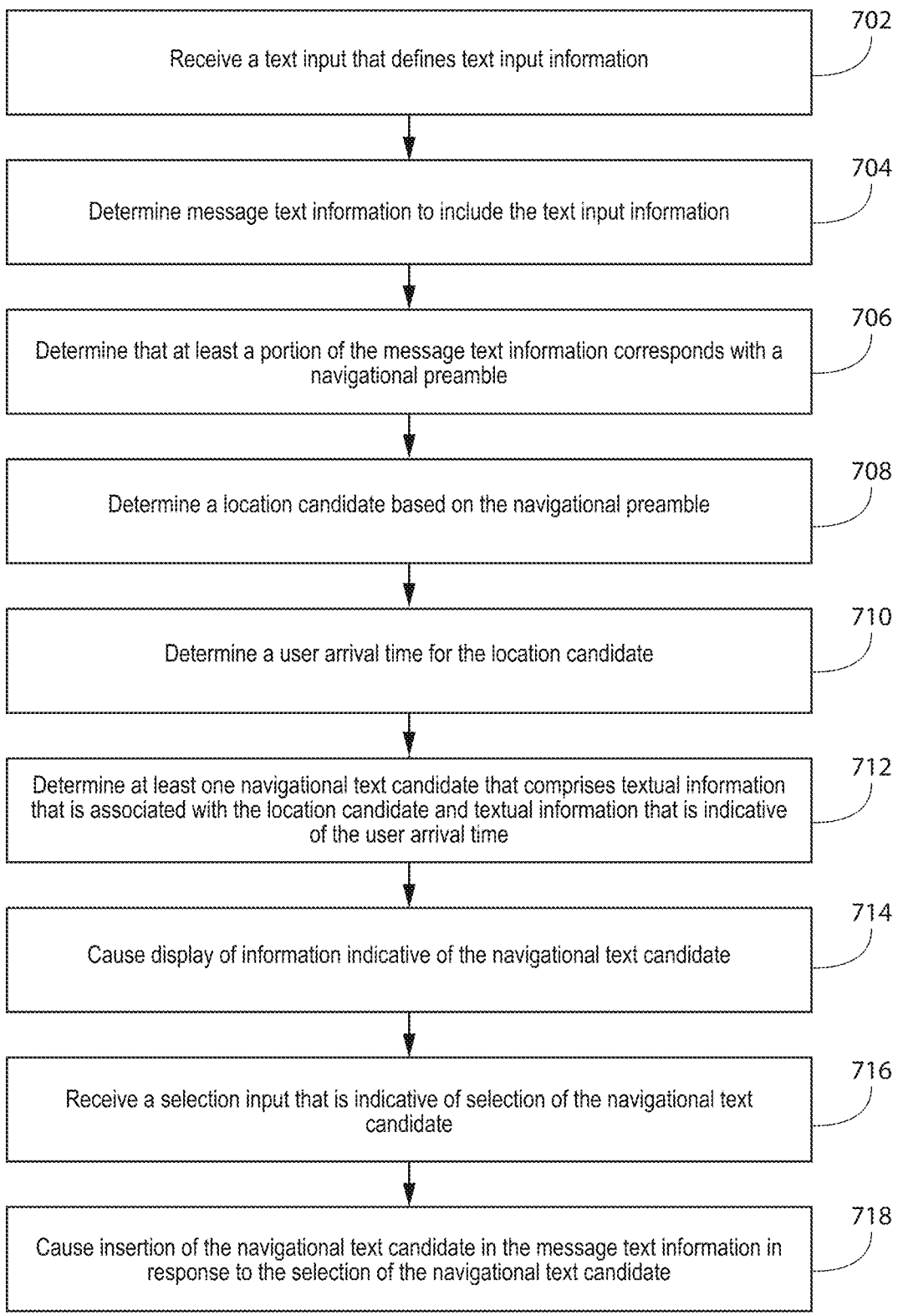
FIG. 7 is a flow diagram illustrating activities associated with determination of at least one navigational text candidate according to at least one example embodiment.

FIG. 7 is a flow diagram illustrating activities associated with determination of at least one navigational text candidate according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As described previously, in some circumstances, it may be desirable to determine a user arrival time for a location candidate, and determine a navigational text candidate that comprises textual information that is indicative of the user arrival time.

At block 702, the apparatus receives a text input that defines text input information. The receipt, the text input, and the text input information may be similar as described regarding FIG. 2 and FIGS. 4A-4C.

At block 704, the apparatus determines message text information to include the text input information. The determination and the message text information may be similar as described regarding FIGS. 4A-4C.

At block 706, the apparatus determines that at least a portion of the message text information corresponds with a navigational preamble. The determination and the navigational preamble may be similar as described regarding FIGS. 4A-4C.

At block 708, the apparatus determines a location candidate based, at least in part, on the navigational preamble. The determination and the location candidate may be similar as described regarding FIGS. 3A-3D, FIGS. 4A-4C, and FIGS. 5A-5C.

At block 710, the apparatus determines a user arrival time for the location candidate. The user arrival time may be similar as described regarding FIGS. 3A-3D, FIGS. 4A-4C, and FIGS. 5A-5C.

At block 712, the apparatus determines at least one navigational text candidate that comprises textual information that is associated with the location candidate and textual information that is indicative of the user arrival time. The determination and the navigational text candidate may be similar as described regarding FIGS. 3A-3D, FIGS. 4A-4C, and FIGS. 5A-5C.

At block 714, the apparatus causes display of information indicative of the navigational text candidate. The causation of display and the information indicative of the navigational text candidate may be similar as described regarding FIGS. 3A-3D, FIGS. 4A-4C, and FIGS. 5A-5C.

At block 716, the apparatus receives a selection input that is indicative of selection of the navigational text candidate. The receipt and the selection input may be similar as described regarding FIGS. 3A-3D, FIGS. 4A-4C, and FIGS. 5A-5C.

At block 718, the apparatus causes insertion of the navigational text candidate in the message text information in response to the selection of the navigational text candidate. The causation of insertion may be similar as described regarding FIGS. 4A-4C.

Figure 8:
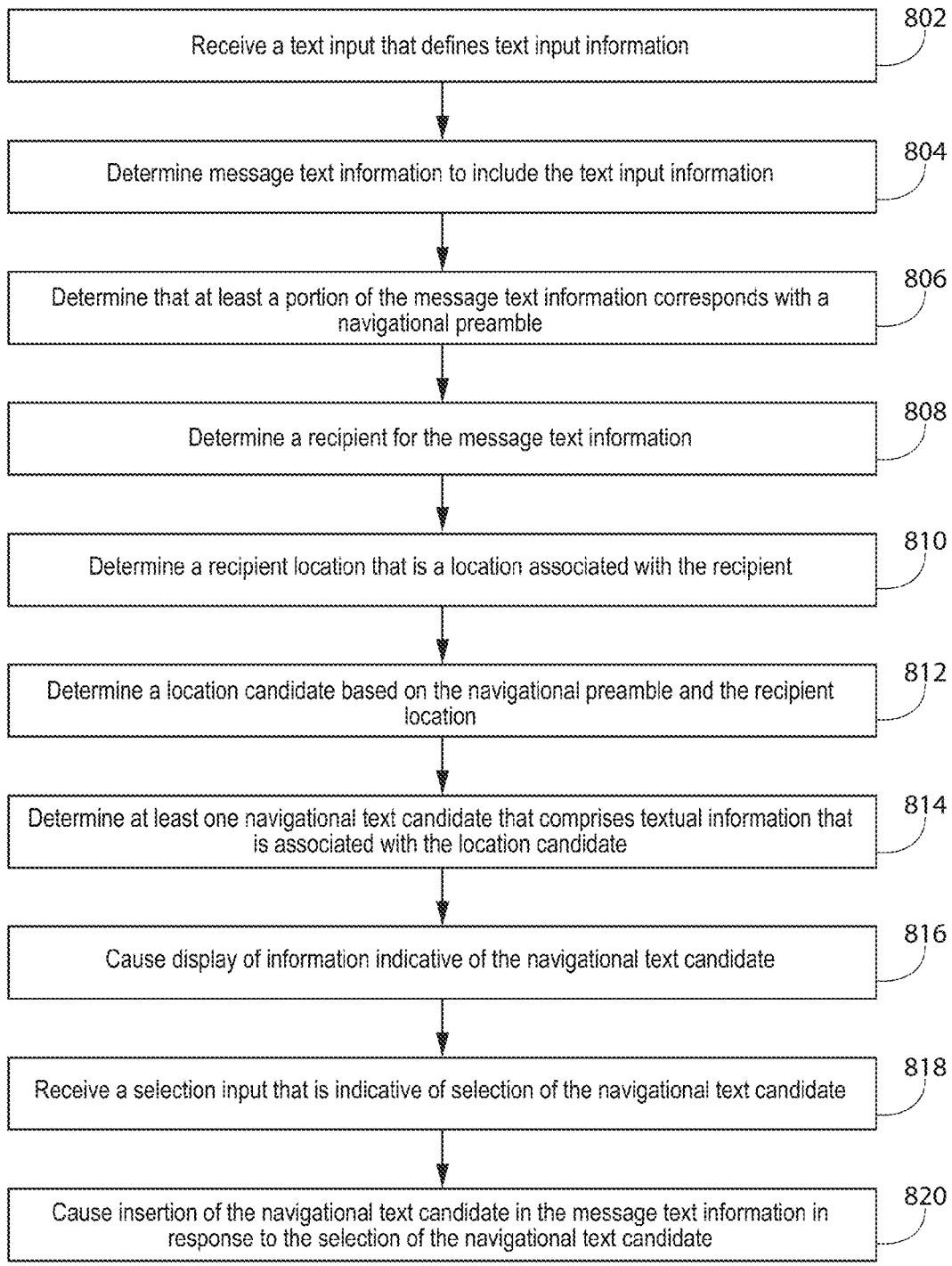
FIG. 8 is a flow diagram illustrating activities associated with determination of at least one navigational text candidate according to at least one example embodiment.

FIG. 8 is a flow diagram illustrating activities associated with determination of at least one navigational text candidate according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As described previously, in some circumstances, it may be desirable to determine a location candidate based, at least in part, on a recipient location.

At block 802, the apparatus receives a text input that defines text input information. The receipt, the text input, and the text input information may be similar as described regarding FIG. 2 and FIGS. 4A-4C.

At block 804, the apparatus determines message text information to include the text input information. The determination and the message text information may be similar as described regarding FIGS. 4A-4C.

At block 806, the apparatus determines that at least a portion of the message text information corresponds with a navigational preamble. The determination and the navigational preamble may be similar as described regarding FIGS. 4A-4C.

At block 808, the apparatus determines a recipient for the message text information. The determination and the recipient may be similar as described regarding FIGS. 3A-3D, FIGS. 4A-4C, and FIGS. 5A-5C.

At block 810, the apparatus determines a recipient location that is a location associated with the recipient. The determination and the recipient location may be similar as described regarding FIGS. 3A-3D, FIGS. 4A-4C, and FIGS. 5A-5C.

At block 812, the apparatus determines a location candidate based, at least in part, on the navigational preamble and the recipient location. The determination and the location candidate may be similar as described regarding FIGS. 3A-3D, FIGS. 4A-4C, and FIGS. 5A-5C.

At block 814, the apparatus determines at least one navigational text candidate that comprises textual information that is associated with the location candidate. The determination and the navigational text candidate may be similar as described regarding FIGS. 3A-3D, FIGS. 4A-4C, and FIGS. 5A-5C.

At block 816, the apparatus causes display of information indicative of the navigational text candidate. The causation of display and the information indicative of the navigational text candidate may be similar as described regarding FIGS. 3A-3D, FIGS. 4A-4C, and FIGS. 5A-5C.

At block 818, the apparatus receives a selection input that is indicative of selection of the navigational text candidate. The receipt and the selection input may be similar as described regarding FIGS. 3A-3D, FIGS. 4A-4C, and FIGS. 5A-5C.

At block 820, the apparatus causes insertion of the navigational text candidate in the message text information in response to the selection of the navigational text candidate. The causation of insertion may be similar as described regarding FIGS. 4A-4C.

Figure 9:
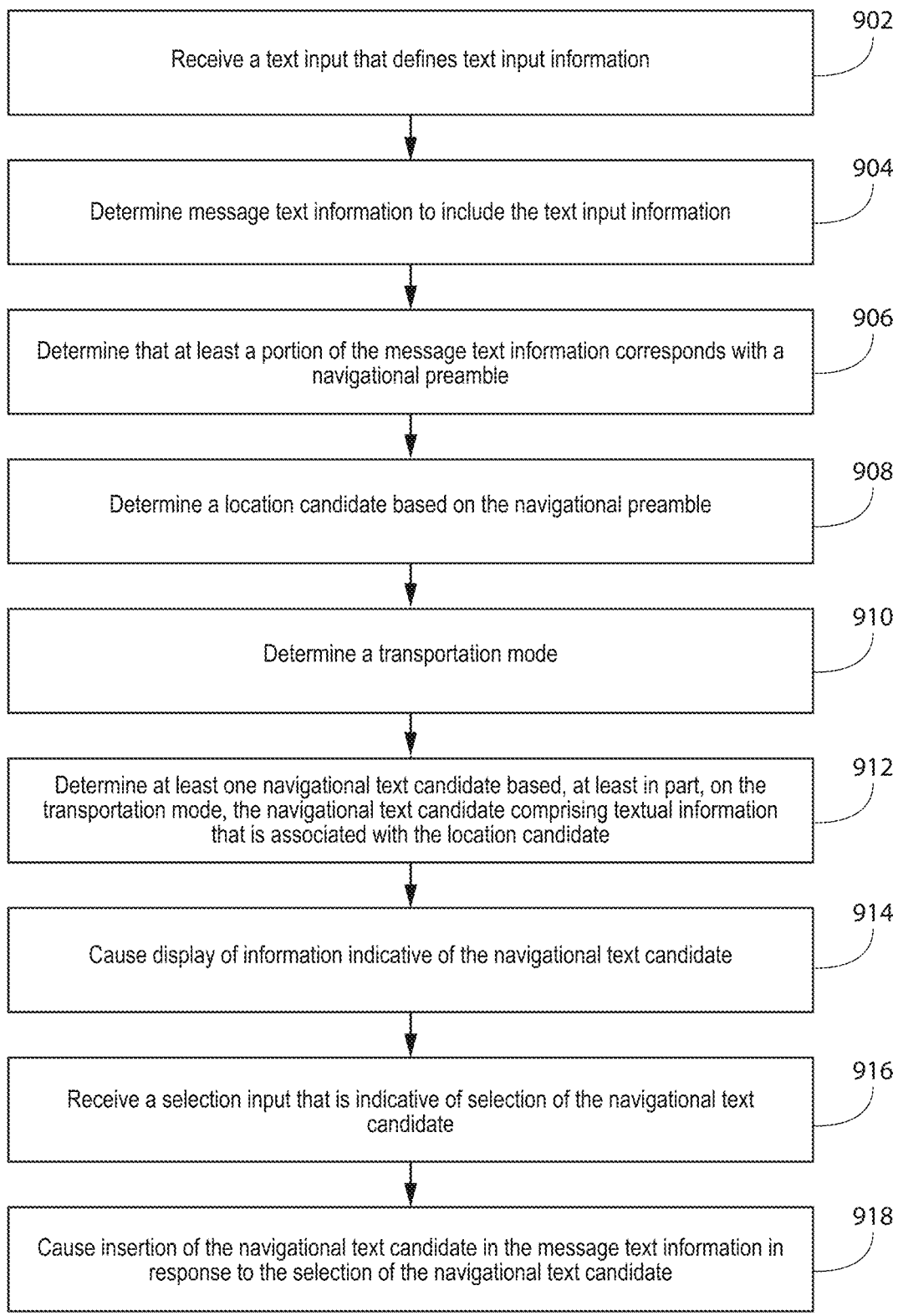
FIG. 9 is a flow diagram illustrating activities associated with determination of at least one navigational text candidate according to at least one example embodiment.

FIG. 9 is a flow diagram illustrating activities associated with determination of at least one navigational text candidate according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As described previously, in some circumstances, it may be desirable to determine a transportation mode, and determination a navigational text candidate based, at least in part, on the transportation mode.

At block 902, the apparatus receives a text input that defines text input information. The receipt, the text input, and the text input information may be similar as described regarding FIG. 2 and FIGS. 4A-4C.

At block 904, the apparatus determines message text information to include the text input information. The determination and the message text information may be similar as described regarding FIGS. 4A-4C.

At block 906, the apparatus determines that at least a portion of the message text information corresponds with a navigational preamble. The determination and the navigational preamble may be similar as described regarding FIGS. 4A-4C.

At block 908, the apparatus determines a location candidate based, at least in part, on the navigational preamble. The determination and the location candidate may be similar as described regarding FIGS. 3A-3D, FIGS. 4A-4C, and FIGS. 5A-5C.

At block 910, the apparatus determines a transportation mode. The determination and the transportation mode may be similar as described regarding FIGS. 3A-3D, FIGS. 4A-4C, and FIGS. 5A-5C.

At block 912, the apparatus determines at least one navigational text candidate that comprises textual information that is associated with the location candidate. In at least one example embodiment, the determination of the navigational text candidate is based, at least in part, on the transportation mode. The determination and the navigational text candidate may be similar as described regarding FIGS. 3A-3D, FIGS. 4A-4C, and FIGS. 5A-5C.

At block 914, the apparatus causes display of information indicative of the navigational text candidate. The causation of display and the information indicative of the navigational text candidate may be similar as described regarding FIGS. 3A-3D, FIGS. 4A-4C, and FIGS. 5A-5C.

At block 916, the apparatus receives a selection input that is indicative of selection of the navigational text candidate. The receipt and the selection input may be similar as described regarding FIGS. 3A-3D, FIGS. 4A-4C, and FIGS. 5A-5C.

At block 918, the apparatus causes insertion of the navigational text candidate in the message text information in response to the selection of the navigational text candidate. The causation of insertion may be similar as described regarding FIGS. 4A-4C.

Figure 10:
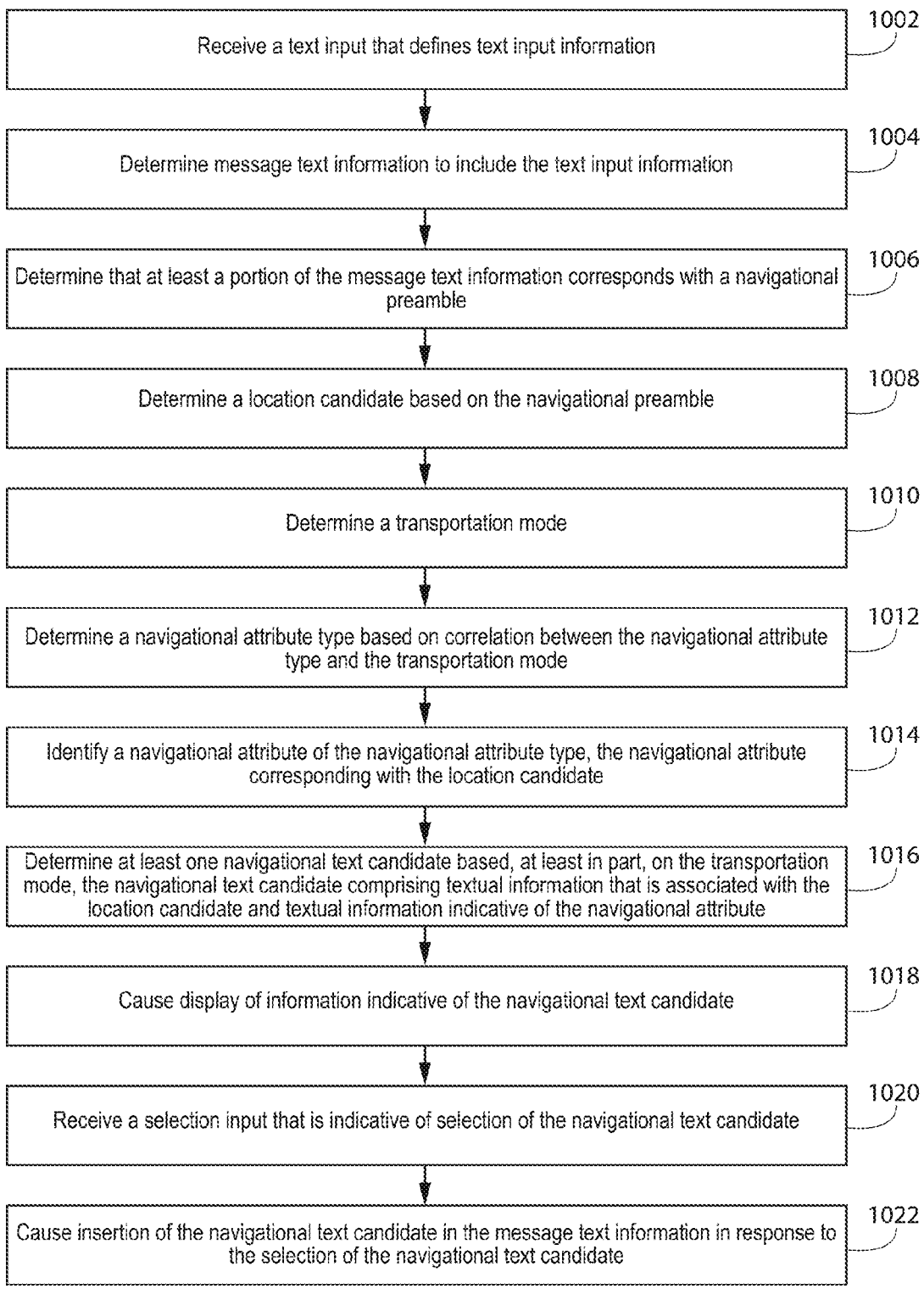
FIG. 10 is a flow diagram illustrating activities associated with determination of at least one navigational text candidate according to at least one example embodiment.

FIG. 10 is a flow diagram illustrating activities associated with determination of at least one navigational text candidate according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As described previously, in some circumstances, it may be desirable to identify a navigational attribute of a navigational attribute type, and determine a navigational text candidate such that the navigational text candidate comprises textual information indicative of the navigational attribute.

At block 1002, the apparatus receives a text input that defines text input information. The receipt, the text input, and the text input information may be similar as described regarding FIG. 2 and FIGS. 4A-4C.

At block 1004, the apparatus determines message text information to include the text input information. The determination and the message text information may be similar as described regarding FIGS. 4A-4C.

At block 1006, the apparatus determines that at least a portion of the message text information corresponds with a navigational preamble. The determination and the navigational preamble may be similar as described regarding FIGS. 4A-4C.

At block 1008, the apparatus determines a location candidate based, at least in part, on the navigational preamble. The determination and the location candidate may be similar as described regarding FIGS. 3A-3D, FIGS. 4A-4C, and FIGS. 5A-5C.

At block 1010, the apparatus determines a transportation mode. The determination and the transportation mode may be similar as described regarding FIGS. 3A-3D, FIGS. 4A-4C, and FIGS. 5A-5C.

At block 1012, the apparatus determines a navigational attribute type based, at least in part, on correlation between the navigational attribute type and the transportation mode. The determination and the navigational attribute type may be similar as described regarding FIGS. 3A-3D, FIGS. 4A-4C, and FIGS. 5A-5C.

At block 1014, the apparatus identifies a navigational attribute of the navigational attribute type. In at least one example embodiment, the navigational attribute corresponds with the location candidate. The identification and the navigational attribute may be similar as described regarding FIGS. 3A-3D, FIGS. 4A-4C, and FIGS. 5A-5C.

At block 1016, the apparatus determines at least one navigational text candidate that comprises textual information that is associated with the location candidate and textual information that is indicative of the navigational attribute. In at least one example embodiment, the determination of the navigational text candidate is based, at least in part, on the transportation mode. The determination and the navigational text candidate may be similar as described regarding FIGS. 3A-3D, FIGS. 4A-4C, and FIGS. 5A-5C.

At block 1018, the apparatus causes display of information indicative of the navigational text candidate. The causation of display and the information indicative of the navigational text candidate may be similar as described regarding FIGS. 3A-3D, FIGS. 4A-4C, and FIGS. 5A-5C.

At block 1020, the apparatus receives a selection input that is indicative of selection of the navigational text candidate. The receipt and the selection input may be similar as described regarding FIGS. 3A-3D, FIGS. 4A-4C, and FIGS. 5A-5C.

At block 1022, the apparatus causes insertion of the navigational text candidate in the message text information in response to the selection of the navigational text candidate. The causation of insertion may be similar as described regarding FIGS. 4A-4C.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 902 of FIG. 9 may be performed before any of blocks 902, 904, 906, or 908 of FIG. 9. Furthermore, if desired, one or more of the above-described functions may be optional or may be combined. For example, block 614 of FIG. 6 may be optional and/or combined with block 616 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
at least one processor;
at least one memory including computer program code, the memory and the computer program code configured to, working with the processor, cause the apparatus to perform at least the following:
receive a text input;
determine a portion of the text input corresponding to a navigational preamble;
determine a location candidate based, at least in part, on the navigational preamble;
generate display information indicative of the location candidate;
receive a selection input selecting the generated display information or a portion thereof; and
inserting text indicative of the location candidate, based on the received selection input, with the text input to generate a text communication.

2. The apparatus of claim 1, wherein the location candidate is based, at least in part, on a user location.

3. The apparatus of claim 1, wherein the memory includes computer program code configured to, working with the processor, cause the apparatus to perform at least the following:
determine a user arrival time for the location candidate, wherein the text communication comprises text indicative of the user arrival time.

4. The apparatus of claim 1, wherein the memory includes computer program code configured to, working with the processor, cause the apparatus to perform at least the following:
determine a recipient for the text communication;
determine a recipient location associated with the recipient; and
determine a recipient arrival time for the location candidate, wherein the location candidate comprises textual chronological information indicative of the recipient arrival time.

5. The apparatus of claim 1, wherein the memory includes computer program code configured to, working with the processor, cause the apparatus to perform at least the following:
determine a recipient for the text communication; and determine a recipient location associated with the recipient, wherein determining the location candidate is based, at least in part, on the recipient location.

6. The apparatus of claim 1, wherein the memory includes computer program code configured to, working with the processor, cause the apparatus to perform at least the following:
   determine a transportation mode, wherein determining the location candidate is based, at least in part, on the transportation mode.

7. The apparatus of claim 6, wherein determining the location candidate comprises:
   determining a navigational attribute type based, at least in part, on correlation between the navigational attribute type and the transportation mode;
   identifying a navigational attribute of the navigational attribute type; and
   determining the location candidate indicative of the navigational attribute.

8. The apparatus of claim 6, wherein: determining the transportation mode comprises determining a user transportation mode and a recipient transportation mode, and determining the location candidate comprises:
   determining a navigational attribute type based, at least in part, on correlation between the navigational attribute type, the user transportation mode, and the recipient transportation mode;
   identifying a navigational attribute of the navigational attribute type; and
   determining the location candidate indicative of the navigational attribute.

9. The apparatus of claim 1, further comprising:
   a display, configured to display the information indicative of the location candidate.

10. A method comprising:
    receiving a text input;
    determining a portion of the text input corresponding to a navigational preamble;
    determining a navigational text candidate based, at least in part, on the navigational preamble;
    displaying the navigational text candidate;
    receiving a selection input indicative of a selection of the navigational text candidate; and
    inserting the navigational text candidate in the text input in response to the selection input.

11. The method of claim 10, further comprising determining a user arrival time for the navigational text candidate, wherein inserting the navigational text candidate comprises inserting textual information indicative of the user arrival time.

12. The method of claim 10, further comprising:
    determining a recipient for the text input;
    determining a recipient location associated with the recipient; and
    determining a recipient arrival time for the location candidate, wherein the navigational text candidate comprises textual chronological information indicative of the recipient arrival time.

13. The method of claim 10, further comprising:
    determining a recipient for the text input; and
    determining a recipient location associated with the recipient, wherein determining the navigational text candidate is based, at least in part, on the recipient location.

14. The method of claim 10, further comprising determining a transportation mode, wherein determining of the navigational text candidate is based, at least in part, on the transportation mode.

15. The method of claim 14, wherein determining the navigational text candidate comprises:
    determining a navigational attribute type based, at least in part, on correlating the navigational attribute type and the transportation mode;
    identifying a navigational attribute of the navigational attribute type; and
    determining the navigational text candidate comprising textual information indicative of the navigational attribute.

16. The method of claim 14, wherein determining the transportation mode comprises determining a user transportation mode and a recipient transportation mode, and determining the navigational text candidate comprises:
    determining a navigational attribute type based, at least in part, on correlating the navigational attribute type, the user transportation mode, and the recipient transportation mode;
    identifying a navigational attribute of the navigational attribute type; and
    determining the navigational text candidate comprising textual information indicative of the navigational attribute.

17. At least one computer-readable medium encoded with instructions that, when executed by a processor, perform at least the following:
    receive a text input;
    determine a portion of the text input corresponding to a navigational preamble;
    determine a location candidate based, at least in part, on the navigational preamble;
    receive a selection input indicative of selecting the location candidate; and
    generate, in response to the selection input, a text communication comprising the text input and the location candidate.

18. The medium of claim 17, further encoded with instructions that, when executed by a processor, perform at least:
    determine a transportation mode, wherein determining the location candidate is based, at least in part, on the transportation mode.

19. The medium of claim 18, wherein determining the location candidate comprises:
    determining a navigational attribute type based, at least in part, on correlating the navigational attribute type and the transportation mode;
    identifying a navigational attribute of the navigational attribute type; and
    determining the location candidate comprising textual information indicative of the navigational attribute.

20. The medium of claim 18, wherein determining the transportation mode comprises determining a user transportation mode and a recipient transportation mode, and determining the location candidate comprises:
    determining a navigational attribute type based, at least in part, on correlating the navigational attribute type, the user transportation mode, and the recipient transportation mode;
    identifying a navigational attribute of the navigational attribute type; and determining the location candidate comprising textual information indicative of the navigational attribute.

\* \* \* \* \*